(12) United States Patent
Sakashita et al.

(10) Patent No.: US 7,499,801 B2
(45) Date of Patent: Mar. 3, 2009

(54) VEHICULAR NAVIGATION SYSTEM

(75) Inventors: Naohiro Sakashita, Obu (JP); Masanori Ohmi, Gifu (JP)

(73) Assignee: DENSO CORPORATION, Kariya (JP)

( * ) Notice: Subject to any disclaimer, the term of this patent is extended or adjusted under 35 U.S.C. 154(b) by 547 days.

(21) Appl. No.: 11/159,149

(22) Filed: Jun. 23, 2005

(65) Prior Publication Data

US 2006/0009904 A1    Jan. 12, 2006

(30) Foreign Application Priority Data

Jul. 7, 2004    (JP)    ............................... 2004-200632

(51) Int. Cl.
*G01C 21/30* (2006.01)
*G01C 21/00* (2006.01)
*B64F 1/18* (2006.01)
*G08G 5/00* (2006.01)

(52) U.S. Cl. .................. 701/211; 701/201; 701/202; 701/207; 701/208; 701/213; 701/210; 340/995.2; 340/995.25

(58) Field of Classification Search ............... 701/25, 701/205, 224, 225, 302
See application file for complete search history.

(56) References Cited

U.S. PATENT DOCUMENTS 6,018,697 A * 1/2000 Morimoto et al. ........... 701/209
6,064,941 A * 5/2000 Nimura et al. .............. 701/210
6,278,943 B1 * 8/2001 Yamauchi ................... 701/211
6,415,222 B1 * 7/2002 Sato et al. ................... 701/208
6,466,867 B1 * 10/2002 Sakashita .................... 701/211
6,466,868 B2 * 10/2002 Sakashita .................... 701/211
6,510,386 B2 * 1/2003 Sakashita .................... 701/211
6,700,505 B2 * 3/2004 Yamashita et al. .......... 340/988
6,728,634 B2 * 4/2004 Monde et al. ............... 701/209

FOREIGN PATENT DOCUMENTS

JP    A-2000-321085    11/2000

OTHER PUBLICATIONS

Office Action dated Dec. 28, 2007 in corresponding Chinese Patent Application No. 2005100832441 (and English translation).

* cited by examiner

*Primary Examiner*—Thomas G Black
*Assistant Examiner*—Sze-Hon Kong
(74) *Attorney, Agent, or Firm*—Posz Law Group, PLC

(57) ABSTRACT

In a vehicular navigation system, it is determined that a branching point is present along a guidance route within a given distance from a guidance intersection. It is then determined that approaching the branching point by using a natural exit lane results in entering a road that is not included in the guidance route, wherein the natural exit lane is included in an exit road exiting from the guidance intersection and exits naturally from the guidance intersection along the guidance route. Before entering the guidance intersection, it is suggested that a lane change be required after passing through the guidance intersection. Thus, in a case that a lane change is needed just after passing through the guidance intersection, a driver can respond with a sufficient time period.

7 Claims, 2 Drawing Sheets

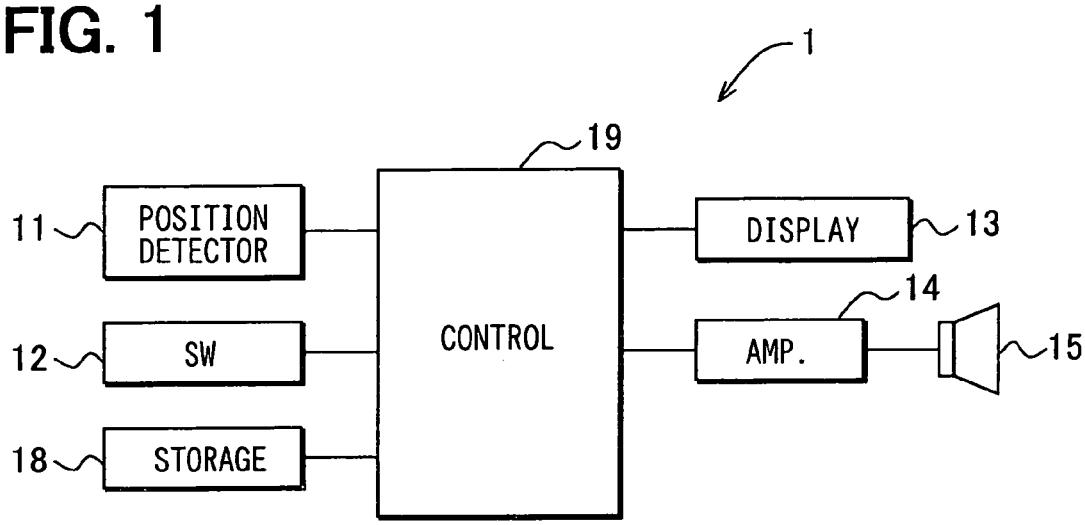
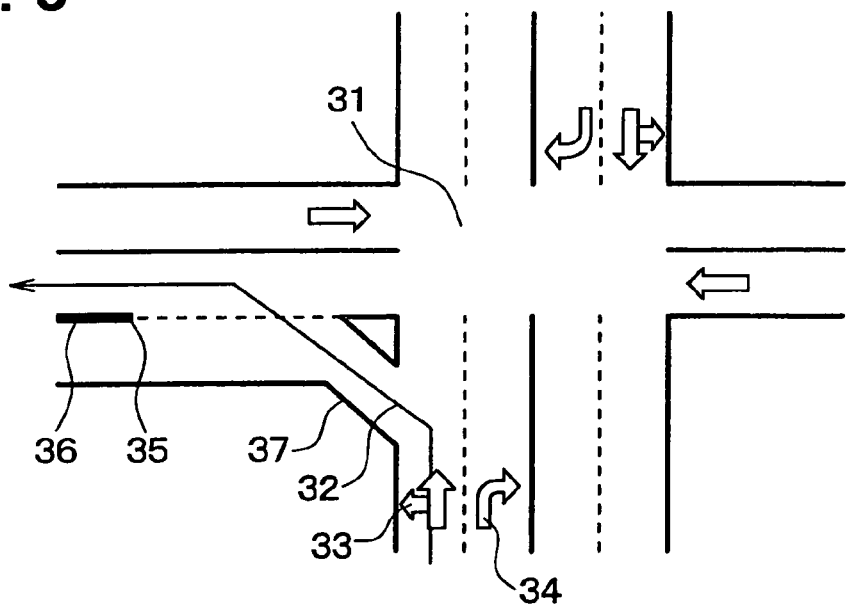

us 7,499,801 B2

VEHICULAR NAVIGATION SYSTEM

CROSS REFERENCE TO RELATED APPLICATIONS

This application is based on and incorporates herein by reference Japanese Patent Application No. 2004-200632 filed on Jul. 7, 2004.

FIELD OF THE INVENTION

The present invention relates to a vehicular navigation system.

BACKGROUND OF THE INVENTION

An on-ramp to an expressway sometimes directly leads to an off-ramp, if a lane is not changed to a main lane just after passing through a converging point with the expressway. To prevent directly entering the off-ramp, a navigation system is proposed that conducts route guidance at a branching point that branches into both of a main lane of the expressway and an off-ramp (Patent Document 1).

Patent Document 1: JP-2000-266556 A (U.S. Pat. No. 6,466,867 B1)

However, in a case that a distance from the converging point to the branching point is short, the route guidance after passing through the converging point may give a user no sufficient time period to determine and operate a lane change. The similar problem may occur also in a guidance intersection. This guidance intersection is referred to as an intersection at which, to follow the route guidance, a subject vehicle needs to conduct turning right or left or the like instead of continuing traveling a road the vehicle is traveling.

For instance, suppose a case that a vehicle turns left by following the route guidance or a guidance route and, just after turning left, suggested that a lane be changed to the rightmost lane so as to follow the guidance route. In this case, the above problem of giving a user no sufficient time period to determine and operate a lane change may also occur.

SUMMARY OF THE INVENTION

It is an object of the present invention to provide a vehicular navigation system to solve the above problem. The system is capable of performing route guidance to give a user a sufficient time period for responding to a case that a lane change needs to be conducted just after passing through a guidance intersection or a converging point so as to follow a guidance route.

To achieve the above object, a vehicular navigation system is provided with the following: A branching point determining unit is included for determining that a branching point is present along a guidance route within a given distance from a guidance intersection. A deviation determining unit is included for determining that approaching the branching point, which is determined to be present within the given distance, by using a natural exit lane results in entering a road that is not included in the guidance route. Here, the natural exit lane is included in an exit road exiting from the guidance intersection and exits naturally from the guidance intersection along the guidance route. A lane-change guiding unit is included for suggesting before entering the guidance intersection that a lane change be required after passing through the guidance intersection, based on a result determined by the deviation determining unit.

Further, by adapting the above guidance intersection to a converging point, the object of the present invention can be also achieved.

BRIEF DESCRIPTION OF THE DRAWINGS

The above and other objects, features, and advantages of the present invention will become more apparent from the following detailed description made with reference to the accompanying drawings. In the drawings:

FIG. 1 is a diagram of a structure of a vehicular navigation system according to an embodiment of the present invention;

FIG. 3 is an overhead view in a vicinity of a guidance intersection with route guidance of a lane change.

DETAILED DESCRIPTION OF THE PREFERRED EMBODIMENTS

Figure 2:
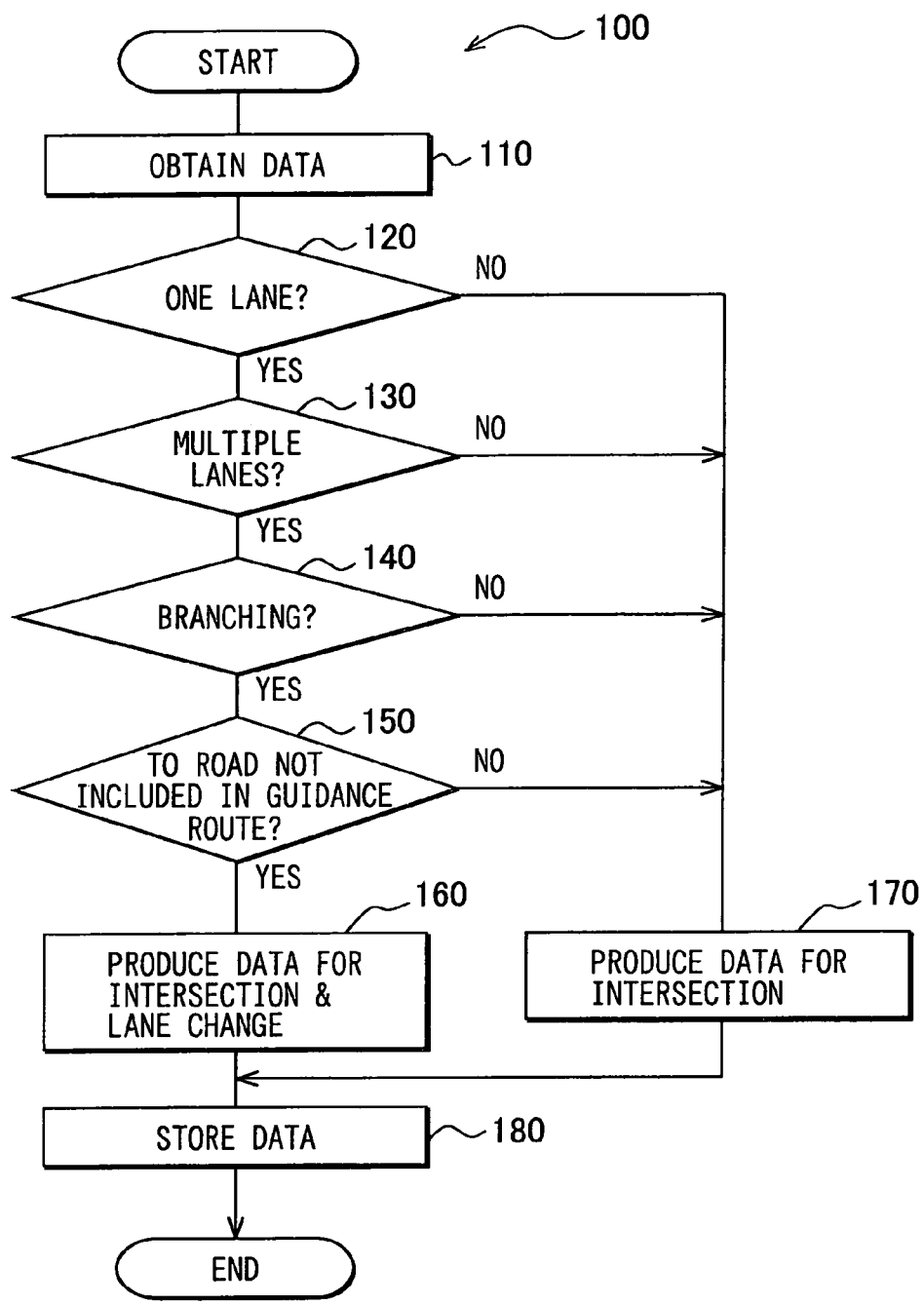
FIG. 2 is a flow chart diagram of a program.

A vehicular navigation system 1 according to an embodiment of the present invention will be explained using drawings. Note that explanation below is based on a left-hand traffic regulation in Japan unless otherwise described.

A hardware structure of the vehicular navigation system 1 mounted in a subject vehicle is shown in FIG. 1. The system 1 includes a position detector 11, an operation switch group 12, an image display unit 13, an audio amplifier 14, a speaker 15, an external storage medium 18, and a control circuit 19.

The position detector 11 includes known sensors such as a geomagnetic sensor, a gyroscope, a speed sensor, and a GPS receiver. The position detector 11 outputs, to the control circuit 19, information that is based on individual characteristics of the sensors and is for designating a current position or an advancing direction of the vehicle.

The operation switch group 12 is an input unit such as multiple mechanical switches disposed in the system 1 or a touch panel disposed on a display screen of the image display unit 13. Signals from user's pushing the mechanical switches or touching the touch panel are outputted to the control circuit 19.

The image display unit 13 displays, to a user, video based on video signals outputted from the control circuit 19. The displayed video includes a map surrounding a current position.

The audio amplifier 14 amplifies sound signals outputted from the control circuit 19.

The external storage medium 18 is a non-volatile storage medium such as a hard disk to store map data for route guiding and programs that is read and executed by the control circuit 19.

The map data include information of positions of links (or road segments) and nodes (or intersections), information of linkage relationships of links and nodes, information of lane numbers of links, and information of exit roads (exit road information) with respect to each lane.

Here, an exit road or exit road information will be explained below in detail. Suppose that a vehicle can pass through an intersection by moving from a first lane of a certain entrance road segment entering the intersection to a certain exit road segment exiting from the intersection. In this case, the exit road information with respect to the first lane of the certain entrance road segment is information of the certain exit road segment.

The control circuit 19 includes a RAM, a ROM, and a CPU (non shown). The CPU executes a program for operating the system 1 read out from the ROM and the external storage medium 18. Here, the CPU reads out information from the ROM, the RAM, and the external storage medium 18, writes the information on the RAM and the external storage medium 18, and exchanges signals with the position detector 11, the operation switch group 12, the image display unit 13, and the audio amplifier 14.

Specific processes executed by the CPU of the control circuit 19 using the programs include a current position designating process, a guidance route retrieving process, and a route guiding process.

The current position designating process designates a current position or an advancing direction of the vehicle using a known map matching technology based on signals from the position detector 11.

The guidance route retrieving process computes an optimum guidance route from a current position to a destination by accepting a destination inputted by a user via an input unit.

The route guiding process outputs an image of the computed guidance route or the computed current position on the image display unit 13 with the image superimposed on a map after reading map data from the external storage medium 18. Furthermore, the route guiding process produces data for guidance using an image or a sound with respect to a guidance intersection within a guidance route and then stores the produced data in the external storage medium 18. Here, this guidance intersection is referred to as an intersection at which, to follow the guidance route or route guidance, a subject vehicle needs to conduct turning right or left or the like instead of continuing traveling a road the vehicle is traveling. When the subject vehicle approaches a guidance intersection, the route guiding process outputs sound data to the audio amplifier 14, or image data to the image display unit 13 based on the guidance data of the guidance intersection.

Next, of the route guiding process, a process for producing the guidance data for each guidance intersection will be explained below. To achieve this process, the control circuit 19 executes a program 100 shown in FIG. 2 each time a subject vehicle approaches a guidance intersection within a guiding route.

At Step 110, data of a target guidance intersection and data of road segments that connect with the target guidance intersection are obtained from the map data.

At Step S120, it is determined whether one or more than one accessible lane is present within an entrance road segment entering to the guidance intersection. Here, the accessible lane within the entrance road segment is used or traveled along the guidance route by the subject vehicle when the subject vehicle does not naturally continue traveling the road the vehicle is traveling before entering the guidance intersection, for instance, when the subject vehicle turns the guidance intersection to the left or right. This determination is executed based on the exit road information with respect to each of lanes included in the entrance road segment. Namely, the number of lanes of the entrance road segment that lead to or are accessible to the exit road segment is computed.

When the accessible lane is only one, the sequence goes to Step 130. When the accessible lane is two or more, the sequence goes to Step 170.

At Step 130, it is determined whether the number of lanes of the exit road segment is multiple or not based on the map data read. When the number is multiple, the sequence goes to Step 140. When the number is only one, the sequence goes to Step 170.

At Step 140, it is determined whether a branching point is present within a given distance (e.g., 100 meters) after passing through the guidance intersection. Here, an intersection is defined as a point where more than two road segments converge, so the intersection includes a converging point and a branching point, further includes a guidance intersection and an intersection excluding the guidance intersection (or no-guidance intersection). Furthermore, an intersection being a branching point along a guidance route is defined as a point where an entrance road along the guidance route branches at the intersection into more than one road segment that is accessible from the entrance road segment. When a branching point is determined to be present within the given distance, the sequence goes to Step 150. Otherwise, the sequence goes to Step S170.

At Step 150, it is determined whether or not the vehicle is destined only for a road segment not included in the guidance route in a case that the vehicle enters or passing through the branching point from a natural exit lane of the exit road segment after passing through the guidance intersection along the guidance route.

Here, that a natural exit lane of the exit road segment after passing through the guidance intersection along the guidance route means the following. For instance, in a case that a vehicle turns left in a left-hand traffic regulation so as to follow the guidance route, the natural exit lane is the leftmost lane of the exit road. It is based on a fact that when the vehicle turns left and an accessible lane is only one within the entrance road segment, the exit lane is often the leftmost lane of the exit road segment. In this explanation, turning left is under the left-hand traffic regulation, e.g., in Japan. Therefore, the above turning left corresponds to turning right in the right-hand traffic regulation, e.g., in the United States of America. Namely, the above turning left means turning to the same side as an advancing side of a road in the traffic regulation.

When the vehicle is determined to be destined only for a road segment not included in the guidance route (or when the vehicle approaches a road segment not included in the guidance route), the sequence goes to Step 160. Otherwise, the sequence goes to Step 170.

At Step 160, guidance data is produced for both the relevant guidance intersection and a lane change that is required after passing through the guidance intersection.

This lane change is for the vehicle to enter a lane leading to the guidance route. The guidance data includes data for sound guidance and image guidance. The sound guidance indicates a turning direction at the guidance intersection and a lane change needed after passing through the guidance intersection. For instance, the sound guidance is "Shortly turn left and then move to the right lane." The image guidance includes a map of the relevant guidance intersection and its related entrance road segment and exit road segment, and further includes signs or illustrations on this map. The signs or the illustrations represent lanes of the entrance road segment and the exit road segment, an accessible lane of the entrance road segment following the guidance route, and relevant lanes to be changed after passing through the guidance intersection.

At Step 170, sound guidance data and image guidance data are produced for indicating the relevant guidance intersection alone. For instance, the image guidance data includes a map including the guidance intersection and an accessible lane to the guidance intersection. Here, the accessible lane is emphatically displayed while overlapped on the map. The sound guidance data is, e.g., "Shortly turn left."

At Step 180 after Step 160 or Step S170, the produced guidance data are stored in the external storage medium 18 and the program 100 ends its execution.

Thus, execution of the program 100 enables the control circuit 19 to store in the external storage medium 18 two types of guidance data relating to a guidance intersection. A first type is produced in the following guidance intersection. An accessible entrance lane of an entrance road segment following a guidance route is only one; the number of lanes of an exit road after passing through the intersection is multiple; a branching point is present within a given distance after passing through the intersection; and a natural exit lane of the exit road segment that exits naturally from the intersection leads to a road segment not included in the guidance route. The first type of guidance data includes guidance for indicating a turning direction at the guidance intersection and for suggesting a lane change needed after passing through the intersection. The second type of guidance data is produced in a guidance intersection other than the above guidance intersection. The second type of guidance data includes guidance for the relevant guidance intersection alone.

Then, the control circuit 19 executes the route guiding process where guidance is performed using sound or display image based on the individual types of guidance data produced and stored. In other words, when the subject vehicle approaches a target position for guidance within a predetermined distance, image signals and sound signals based on the relevant guidance data are outputted to the image display unit 13 and the audio amplifier 14, respectively. Then, the image display unit 13 displays a guidance display image while the speaker 15 outputs a guidance sound.

FIG. 3 shows an overhead view around a guidance intersection in a case where the guidance intersection and a lane change required after passing through the guidance intersection need to be indicated. In this view, a guidance route 32 runs from an entrance road having two lanes at one direction at the lower side of the guidance intersection 31 in FIG. 3 via the guidance intersection 31 to an exit road having two lanes at one direction at the left side of the guidance intersection 31 in FIG. 3. The entrance road has only one accessible entrance lane to be able to lead to the exit road. This only one accessible lane is the left lane, as shown in on-road paints 33, 34. The exit road further branches into two roads at a branching point 35 by a lane separator 36. When the vehicle continues to travel the left lane of the exit road, the vehicle enters the left road of the two roads. The left lane is destined for or leads to a road that is not included in the guidance route 32. Furthermore, a distance from an entrance of a shortcut path 37 to the branching point 35 is within the given distance.

In this example shown in FIG. 3, the system 1 determines based on map data the following: an accessible entrance lane is only one; the exit road has two lanes; a distance between the guidance intersection 31 and the branching point 35 is within the given distance; reaching the branching point 35 using the left lane of the two lanes after turning left results in deviation from the guidance route 37. The system 1 then executes, based on the determinations, guidance that indicates the guidance intersection 31 and a lane change required after passing through the guidance intersection 31, using sounds and display images.

The above structure of the system 1 enables a driver of the subject vehicle to be indicated guidance for a lane change needed after passing through the guidance intersection, at a time before entering the guidance intersection. The driver can respond to the guidance well in advance with leeway.

Furthermore, the present invention can be also adapted to a converging point such as an entrance to an expressway. This also affords leeway for driver's determinations or operations. For instance, the following case takes place. A vehicle travels an on-ramp to an expressway and enters the expressway; when not changing lanes, the vehicle enters via a branching point a branching road destined for an off-ramp of the expressway. In this case, guidance relating to the branching point can be provided before converging to the expressway by substituting a converging point for a guidance intersection in the steps of the program 100.

Furthermore, the present invention can be also adapted to a non-guidance intersection (an intersection excluding the guidance intersection) instead of a guidance intersection. This also affords leeway for driver's determinations or operations.

Furthermore, an example of a natural exit lane after passing through the guidance intersection along the guidance route is the leftmost lane of the exit road when turning left at the guidance intersection. However, the natural exit lane can include another example. For instance, suppose that map data includes, relating to an intersection, information of a one-on-one correspondence relationship between a certain lane of an entrance road segment and a natural exit lane of an exit road segment that is connected with the certain lane of the entrance road segment via a guidance intersection. In this case, the above natural exit lane can be determined based on the information of the one-on-one correspondence relationship of the map data. Here, which lane of multiple lanes of the entrance road segment a subject vehicle uses needs to be known to obtain a natural exit lane of an exit road segment. For this purpose, that is, to designate a position of the vehicle within the entrance road segment, the following technologies or methods can be adopted. A lane designating method can be adopted that obtains a road image from an in-vehicle camera to designate a lane that the vehicle is currently traveling based on a positional relationship of white lane markers within the image. Otherwise, a method can be also adopted that is based on high accuracy vehicle's position designation such as RTK-GPS (Real Time Kinematic-Global Positioning System) technology.

Furthermore, even when only one accessible entrance lane for turning left at the guidance intersection is present, it is not always necessary that a natural exit lane of the exit road is assigned to the leftmost lane of the exit road. For instance, only in a case where a shortcut path 37 dedicated for turning left is provided in the guidance intersection as a only one accessible entrance lane, the leftmost lane of the exit road can be always regarded as a natural exit lane of the exit lane.

Furthermore, even when multiple accessible entrance lanes are present, the following can take place. Suppose that two accessible entrance lanes are present in the entrance road at a guidance intersection and three lanes are present in the exit road. Further suppose that two leftmost lanes of the three lanes of the exit road are natural exit lanes in a case of entering from the two accessible entrance lanes and exiting from the guidance intersection. Further suppose that a branching point is present within a given distance and the rightmost lane of the three lanes of the exit road only leads to a road included in a guidance route. In this case, the system 1 can be designed to suggest, before entering the guidance intersection, a lane change to the rightmost lane after passing through the guidance intersection.

Furthermore, guidance for lane change is executed based on whether a branching point is within a given distance from a guidance intersection in the embodiment. Here, the given distance can be preliminary determined as a constant in the program 100 or determined by computation based on various conditions as long as the given distance is determined before the determination.

The conditions for the computation include, e.g., a traffic amount at the guidance intersection. When a traffic amount is heavy, a lane change is supposed to be difficult. When a traffic amount is not heavy, a lane change is supposed to be easy. Therefore, at the large traffic amount, the given distance can be increased. At the small traffic amount, the given distance can be decreased. A traffic amount can be obtained by using VICS (Vehicle Information Communication System) or known traffic information services.

Furthermore, guidance for lane change can be executed using a given necessary time via the guidance intersection to the branching point calculated from an average speed around the guidance intersection instead of the given distance. This determination parameter can be regarded as a reference for determining the given distance. Here an average speed can be preliminarily included in the map data or obtained from the above-described traffic services such as VICS.

Furthermore, the sound guidance data produced at Step 160 by the control circuit 19 can be produced in multiple times (e.g., three times) every certain distance (e.g., 100 meters) before entering a relevant guidance intersection. Furthermore, only at the last time of the multiple times of sound guidance, both of the relevant guidance intersection and the lane change required after passing the guidance intersection can be designed to be guided using sounds. Namely, at other times, only the guidance intersection can be guided using sounds. Otherwise, at every multiple times, both of the relevant guidance intersection and the lane change after passing the guidance intersection can be designed to be guided additionally using sounds.

Furthermore, the program 100 can be stored in a computer-readable medium and loaded into the vehicular navigation system 1 using an interfacing device when needed. Furthermore, the program can be also downloaded into the system 1 via a communications network when needed.

It will be obvious to those skilled in the art that various changes may be made in the above-described embodiments of the present invention. However, the scope of the present invention should be determined by the following claims.

What is claimed is:

1. A vehicular navigation system comprising:
    an entrance lane number determining unit that determines that an entrance road entering a guidance intersection includes one or more lanes accessible to an exit road exiting from the guidance intersection, the entrance road and the exit road being along a guidance route;
    an exit lane number determining unit that determines that the exit road includes more than one lane when the entrance lane number determining unit determines that the entrance road includes only one lane accessible to the exit road;
    a branching point determining unit that determines that a branching point is present along the guidance route within a given distance after the guidance intersection when the exit lane number determining unit determines that the exit road includes more than one lane;
    a deviation determining unit that determines, when the branching point determining unit determines that the branching point is present within the given distance, that approaching the branching point by using a natural exit lane of the exit road, the natural exit lane exiting naturally from the guidance intersection, will result in entering a road that is not included in the guidance route; and
    a lane-change guiding unit that suggests before entering the guidance intersection that a lane change be required from the natural exit lane to another exit road lane after passing through the guidance intersection, based on a result determined by the deviation determining unit.

2. The navigation system of claim 1,
    wherein when the entrance lane number determining unit determines that (i) the entrance road includes only one lane, which enters the guidance intersection and is accessible for turning right along the guidance route under a right-hand traffic regulation and (ii) the natural exit lane is a rightmost lane of a plurality of exit lanes of the exit road, the deviation determining unit determines that approaching the branching point by using the natural exit lane results in entering the road that is not included in the guidance route.

3. The navigation system of claim 1,
    wherein when the entrance lane number determining unit determines that (i) the entrance road includes only one lane, which enters the guidance intersection and is accessible for turning left along the guidance route under a left-hand traffic regulation and (ii) the natural exit lane is a leftmost lane of a plurality of exit lanes of the exit road, the deviation determining unit determines that approaching the branching point by using the natural exit lane results in entering the road that is not included in the guidance route.

4. The navigation system of claim 1,
    wherein the lane-change guiding unit also suggests, before entering the guidance intersection, guidance relating to the guidance intersection in addition to that a lane change be required after passing through the guidance intersection.

5. A vehicular navigation system comprising:
    an entrance lane number determining unit that determines that an entrance road entering a converging point includes one or more lanes accessible to an exit road exiting from the converging point, the entrance road and the exit road being along a guidance route;
    an exit lane number determining unit that determines that the exit road includes more than one lane when the entrance lane number determining unit determines that the entrance road includes only one lane accessible to the exit road;
    a branching point determining unit that determines that a branching point is present along the guidance route within a given distance after the converging point when the exit road is determined to include more than one lane;
    a deviation determining unit that determines, when the branching point is determined to be present within the given distance, that approaching the branching point by using a natural exit lane of the exit road, the natural exit lane exiting naturally from the converging point, will result in entering a road that is not included in the guidance route; and
    a lane-change guiding unit that suggests before entering the converging point that a lane change be required from the natural exit lane to another exit road lane after passing through the converging point, based on a result determined by the deviation determining unit.

6. A computer program product in a computer-readable medium for use in a vehicular navigation system, the product comprising:
    instructions for determining that an entrance road entering a guidance intersection includes one or more lanes accessible to an exit road exiting from the guidance intersection, the entrance road and the exit road being along a guidance route;
    instructions for determining that the exit road includes more than one lane when the entrance road is determined to include only one lane accessible to the exit road;
    instructions for determining that a branching point is present along the guidance route within a given distance from the guidance intersection;

instructions for determining, when the branching point is determined to be present within the given distance, that approaching the branching point by using a natural exit lane of the exit road, the natural exit lane exiting naturally from the guidance intersection, will result in entering a road that is not included in the guidance route; and instructions for then suggesting, before entering the guidance intersection, that a lane change be required from the natural exit lane to another exit road lane after passing through the guidance intersection when the branching point is determined to be present within the given distance.

7. A computer program product in a computer-readable medium for use in a vehicular navigation system, the product comprising:

instructions for determining that an entrance road entering a converging point includes one or more lanes accessible to an exit road exiting from the converging point, the entrance road and the exit road being along a guidance route;

instructions for determining unit that the exit road includes more than one lane when the entrance road is determined to include only one lane accessible to the exit road;

instructions for determining that a branching point is present along the guidance route within a given distance from the converging point;

instructions for determining that approaching the branching point by using a natural exit lane will result in entering a road that is not included in the guidance route, wherein the natural exit lane is included in the exit road exiting from the converging point and exits naturally from the converging point along the guidance route; and instructions for then suggesting, before entering the converging point, that a lane change be required from the natural exit lane to another exit road lane after passing through the converging point when the branching point is determined to be present within the given distance.

* * * * *